May 16, 1967  B. J. THOMAS ET AL  3,320,583
CONVERSION OF SEISMOGRAMS TO IMPEDANCE LOGS
USING AN ANALOG DEVICE
Filed Sept. 15, 1964  3 Sheets-Sheet 1

SEISMIC FIELD RECORD

DOWNHOLE VELOCITY LOG

IMPEDANCE LOG

INVENTORS
BOBBY J. THOMAS,
DONALD E. DUNSTER &
BY DOUGLAS S. SULLIVAN

William J. Miller
ATTORNEY

May 16, 1967  B. J. THOMAS ET AL  3,320,583
CONVERSION OF SEISMOGRAMS TO IMPEDANCE LOGS
USING AN ANALOG DEVICE

Filed Sept. 15, 1964  3 Sheets-Sheet 2

INVENTORS
BOBBY J. THOMAS,
DONALD E. DUNSTER &
BY  DOUGLAS S. SULLIVAN
William J. Miller
ATTORNEY May 16, 1967

B. J. THOMAS ET AL 3,320,583

CONVERSION OF SEISMOGRAMS TO IMPEDANCE LOGS USING AN ANALOG DEVICE

Filed Sept. 15, 1964

INVENTORS
BOBBY J. THOMAS,
DONALD E. DUNSTER &
BY DOUGLAS S. SULLIVAN

William J. Miller
ATTORNEY

United States Patent Office 3,320,583
Patented May 16, 1967

3,320,583
CONVERSION OF SEISMOGRAMS TO IMPEDANCE LOGS USING AN ANALOG DEVICE
Bobby J. Thomas, Donald E. Dunster, and Douglas S. Sullivan, Ponca City, Okla., assignors to Continental Oil Company, Ponca City, Okla., a corporation of Delaware
Filed Sept. 15, 1964, Ser. No. 396,512
16 Claims. (Cl. 340—15.5)

This invention relates generally, as indicated, to an improvement in the art of conducting geophysical surveys; and more particularly, but not by way of limitation, the invention relates to apparatus for deriving an impedance log of a particular terrestrial location.

This invention discloses particular apparatus for carrying out the method as described in the copending case of M. R. Lee et al., Ser. No. 325,017, filed Nov. 20, 1963, and entitled, "Method for Producing Impedance Logs Using Seismographic Techniques." The above application is assigned to the assignee of the present invention.

Heretofore, one of the most reliable ways to obtain stratigraphic information about a given location was by taking a continuous velocity log in the area. This requires that an existing well bore be available in the area and then suitable logging equipment is lowered into the well. Log readings are then taken at regular distances down the borehole and the resulting readings are arranged in graph form by a recording apparatus to show the earth's relative density versus the depth. Other indicators, such as seismograms, may be taken by acoustic sounding equipment located on the earth's surface; however, these seismic records are difficult of interpretation and nearly always require some pre-existent subterranean information to verify the various interpretive findings.

It has been known for some time that the acoustic reflection pattern making up a seismogram contains varying information relating to strata, and that it is compiled on a time-base which can be equated to depth. Extraneous earth effects tend to mask much of the desired acoustic reflection information; and so, various processes are now in use whereby the return seismic signals are limited, filtered, shaped, etc., to allow maximum information derivation. In particular, recent exploration devices employing a vibrational acoustic energy source, controlled at a unique, known frequency rate, enable a much greater recovery of information than the prior known energy sources, such as dynamite, weight-drop, etc. A seismogram obtained by the vibrational method can be processed further to obtain still more information than was possible with the previously used energy sources. The impedance log is one result of such further processing and is the subject of this disclosure.

The vibrational method for determining the two-way travel times of seismic energy employs a non-repetitive seismic signal of known frequency bandwidth, known frequency content, and known phase orientation of the frequency components. The generated seismic signal has a continuously varying frequency between upper and lower limits to produce what is referred to by workers in the art as a sweep signal, either an upsweep or a downsweep. The seismic sweep signal is generated by a transducer which is capable of accurately reproducing the same signal under substantially any conditions. Various compositing techniques involving the sequential generation of the same signal at different points on the earth and the recordation of the reflections at predetermined spaced points have been developed for reducing interference noise and, in effect, amplifying the sweep signal reflections. The composited signal is then correlated against a sample of the original sweep signal to produce an impulse equivalent seismogram from which the two-way travel time of the seismic energy to the identifiable "seismic events" can be determined. This general method is described in its various aspects in U.S. Patents Nos. 2,688,124; 2,989,726; 2,808,577; 2,874,795; 2,981,928 and others, all of which are assigned to the assignee of the present invention.

Some previous attempts have been made to convert conventional seismic data to the impedance log type of presentation. One such method uses explosively generated seismic signals which are processed by a so-called inverse filter, based on the first received reflection signal, to eliminate instrumentation effects and ultimately obtain an impedance log type of presentation which is said to be more susceptible to interpretation than the conventional seismic data; however, this and other attempts are believed to be impractical from an operational standpoint and they are of questionable reliability.

The present invention enables the use of surface-located equipment to derive an impedance log of a given subsurface location. Having derived a seismogram, and preferably one having a phase compensated and amplitude normalized signal content, the present analog device performs a predetermined operation on a seismic signal to derive an output signal which is proportional to the earth's density as a function of depth. This analog device is an improvement on the present digital computer methods which have been used to convert seismograms to impedance logs. The present invention allows a considerable reduction of the time and cost involved by elimination of the necessary digitalization time and computer time; and also, the analog equipment is very compact and can be easily transported and used in the field.

The present invention contemplates apparatus for performing a predetermined operation on a seismic reflection signal, representing a series of seismic occurrences or events, whereby a signal derived from a particular seismic occurrence is operated on in a first circuit to integrate the signal with respect to time, and then the integrated signal is processed through an exponential circuit to produce an output signal which is then recorded or otherwise displayed an an impedance log presentation. In a more limited aspect, the present invention contemplates the processing of a seismogram, which represents seismic return over a known duration, wherein the continual seismic signal is converted into electrical form to be sequentially processed; first, by integration with respect to time; second, by amplification or attenuation in accordance with an empirical constant; third, by performing an exponential operation; fourth, by further amplification or attenuation in accordance with a second constant, which will be known for the particular terrestrial area; and last, by recording or display of the processed signal at a related time-base to provide an impedance log presentation.

It is an object of this invention to provide an improved apparatus for determining the lithologic character of the subsurface of a given terrestrial area without the need for penetrating the earth's surface.

It is another object of this invention to derive an impedance log from a conventional seismogram which is representative of stratigraphic information for a given terrestrial location.

It is still another object of this invention to provide a computing device for deriving an impedance log which is compact and easily transported in the field.

It is still a further object of this invention to provide a computing device for enabling derivation of an impedance log from a seismogram in much less total time than is presently required.

Finally, it is an object of this invention to provide geophysical exploration equipment which achieves comparably reliable exploration results with a great reduction of the time and expense involved.

Other objects and advantages of the invention will be evident from the following detailed description when read in conjunction with the accompanying drawings which illustrate the invention.

*General and theoretical*

Figure 1:
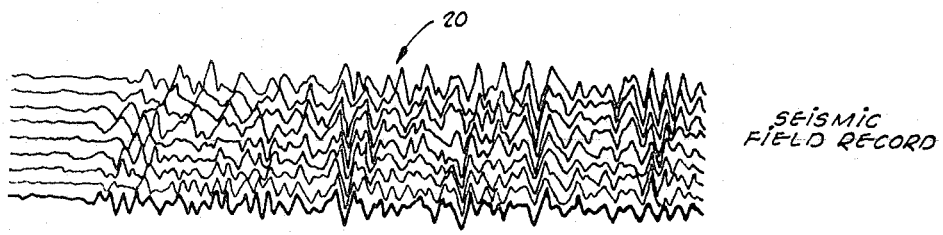
FIG. 1 shows an example of a typical seismic field record of a given area.

This apparatus performs a method of converting a particular form of seismic record into a form which is related to the variation of one lithological parameter (the acoustic impedance, which is the product of density and velocity) with the seismic energy travel time. If adequate over-all velocity information is available, the impedance log as a function of time can be put into the form of an impedance log as a function of depth. The reason for making the transformation is to obtain a log which has a direct relation to the variation of an earth parameter, rather than the seismic record, which is indirectly related.

The analog device of this invention performs the method which has been disclosed in the copending case, Ser. No. 325,017. This method defines an analog operation on a seismic signal which is the result of prior computational and empirical findings as to the behavior of seismic energy when propagated through the earth and reflected back up to a detecting means.

The general mathematical form for operation is:

$$V(t) = V_o e^{a \int_0^t s(t)dt}$$

where:

$V(t)$ = instantaneous velocity,
$V_o$ = initial velocity,
$a$ = gain factor,
$S(t)$ = seismic trace, and
$e$ = base of natural logarithms.

In order to explain fully the conversion process and the derivation of the applied equation, it is first necesssary to explain the process of reflection of seismic signals. For a given interface between two subterranean strata, the acoustic impedances can be give by Z Z+ΔZ; hence, physical theory shows that the reflection coefficient associated with this boundary is given by the formula $$\Delta R = \frac{(Z + \Delta Z) - Z}{(Z + \Delta Z) + Z} \qquad (1)$$

If the change of acoustic impedance is small, it can be stated as $$\Delta R = \frac{\Delta Z}{2Z} \qquad (2)$$

Then, in accordance with the standard table of differentials, it can be shown that $$\Delta R = \tfrac{1}{2} \Delta(\log_e Z) \qquad (3)$$

To state this another way, the variation of reflection coefficient is equal to one-half the variation of the natural logarithm of the acoustic impedance.

In the earth, it is known that the acoustic impedance changes in a smooth manner. The smooth, continual curve may be approximated by making it up of a number of steps at intervals of time $\Delta t$, the approximation becoming increasingly better as the time intervals $\Delta t$ are reduced. Therefore, each instantaneous reflection coefficient, as when acting through each short time interval, will give rise to a seismic impulse whose value is a function of the reflection coefficient. Thus, the reflectivity, $r(t)$, at a given time can be defined as that value which, when multiplied by the time through which it acts, gives rise to the reflection coefficient; and it can then be written that $$\Delta R = r t \cdot \Delta t = \tfrac{1}{2} \Delta(\log_e Z(t)) \qquad (4)$$

By rearranging terms and reducing $\Delta t$ to a value approaching infinity the equation may be written $$r(t) = \tfrac{1}{2} \frac{d(\log_e Z(t))}{dt} \qquad (5)$$

The reflectivity, as derived in Equation 5, can be defined as the seismic record (without multiples) which would be obtained if an infinite bandwidth impulse were introduced into the earth. This record would be related in an indirect, although known, way to the acoustic impedance variation $Z(t)$. Thus, this formula can be inverted to obtain the acoustic impedance log in terms of the infinite bandwidth seismic record as follows: Both sides of the Equation 5 are integrated with respect to time to derive $$\int_0^t r(t)dt = \tfrac{1}{2} \log_e \frac{Z(t)}{Z(o)} \qquad (6)$$

and then by taking the exponential of both sides $$e^{2\int_0^t r(t)dt} = \frac{Z(t)}{Z(o)} \qquad (7)$$

which upon rearrangement yields $$Z(t) = Z(o) e^{2\int_0^t r(t)dt} \qquad (8)$$

the basic formula for acoustic impedance when infinite bandwidth is available.

The requirement of infinite bandwidth is not consonant with the known methods of deriving a seismic trace; therefore, a very useful approximation can be made to give the approximate impedance log, $\overline{Z}(t)$, by employing a seismic trace, $S(t)$, instead of the infinite bandwidth record, $r(t)$. Effectively, this means that a filtered version of $r(t)$ is employed, such that its phase remains unchanged but it is restricted in bandwidth between upper and lower cut-off frequencies. Thus, a closely approximate impedance log is derived from processing a finite bandwidth, impulse-type seismic record represented by $S(t)$ in accordance with the equation $$\overline{Z}(t) = Z(o) e^{A \int_0^t S(t)dt} \qquad (9)$$

wherein, $\overline{Z}(t)$ represents the approximate seismic energy (acoustic) impedance log as a function of seismic energy travel time, $Z(o)$ is a constant representing the seismic energy impedance at time zero, and A is an empirically derived constant.

The acoustic impedance Z is a product of both the density and the velocity along a given earth path of travel. Since the density variations along a given path will be constant the variation of the acoustic impulse velocity V can be expressed directly in terms of the varying acoustic impedance Z, and so the equation $$V(t) = V_o e^{a \int_0^t S(t) dt} \qquad (10)$$

can be stated wherein:

$V(t)$ = the instantaneous acoustic impulse velocity,
$V_o$ = the initial velocity at the earth's surface,
$a$ = an empirically derived gain factor,
$S(t)$ = a time-analog seismic trace, and
$e$ = the base of the natural logarithms.

The analog device of the invention can then process a recorded seismic trace (in terms of velocity as is available in the seismic trace) in accordance with the above conversion Formula 10 to derive the close approximation to a continuous velocity log, a well-known and accurate geophysical tool. The initial velocity, $V_o$, is usually known for a given area; or, if necessary, it can be easily found since it is merely the velocity of seismic energy propagation at the earth's surface. Since any incremental variations in velocity will be dirctly related to the respective impedance factor, a time versus amplitude plot of the computed instantaneous velocity, $V(t)$, will approximate the impedance log of that area from which the seismic trace, $S(t)$, has been recorded.

In order to show a best approximation to the impedance log, it has been found that a seismic record (containing the $S(t)$ trace) which has been phase correlated and amplitude normalized should be employed. These signal processes are known in the art and consist of the following. Phase correlation is a process whereby a detected seismic trace is compared with a record of the acoustic source input frequency where the respective frequency components are reoriented relative to a common phase point. This correlation process is especially useful where the source input frequency is a precise sweep of frequencies between predetermined limits and for a predetermined period of time, such as a sweep from 10–90 c.p.s. over a period of several seconds. This is the type of input employed for an acoustic energy source of the vibrational type and, as it was stated, the use of a unique, controlled frequency lends itself most readily to the correlation processing method. The method and apparatus for correlation is a subject of the United States Patent No. 2,989,726 to J. M. Crawford and W. E. N. Doty.

Amplitude normalization is a signal process wherein relative amplitudes of predetermined segments (e.g., octaves) of the frequency spectrum, preferably of equal bandwidth, are adjusted by selective attenuation or amplification to normalize a correlated signal to correct for uneven attenuation by the earth of various spectral segments of the range of frequencies transmitted by the acoustic energy source. This signal process is the subject of United States Patent No. 2,808,577 to J. M. Crawford and W. E. N. Doty.

Referring now to the drawings, FIG. 1 shows a typical seismic field record 20 as taken by a well-known method of detecting the reflected acoustic energy and recording the indications. This seismogram has nine separate traces and represents the detected energy from a nest of nine separate detectors which were arrayed in a given survey location in a conventional manner. It is apparent that interpretation of the various trace derivations requires skillful and experienced personnel, and that any other pre-existent information which may be available for the same location would help greatly in formulating stratigraphic information.

Figure 2:
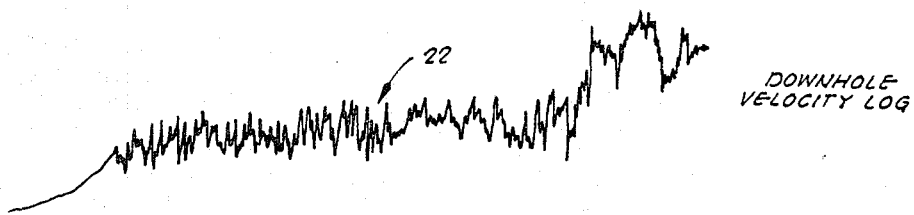
FIG. 2 shows a downhole velocity log as taken in the area referred to in FIG. 1.

A form if information which can be derived from a pre-existent well bore in the area is the continual velocity log (CVL) 22, shown in FIG. 2. This is a graph of the earth's relative density per the depth of the borehole. A logging tool or suitable energy source is passed down the borehole and the incremental admissibility of the earth to the logging energy is measured along the length (depth) of the borehole. This is probably the most accurate means of determining the stratigraphic makeup of a given area, and it provides a great amount of positive information which can be applied in operating related geophysical equipment.

Figure 3:
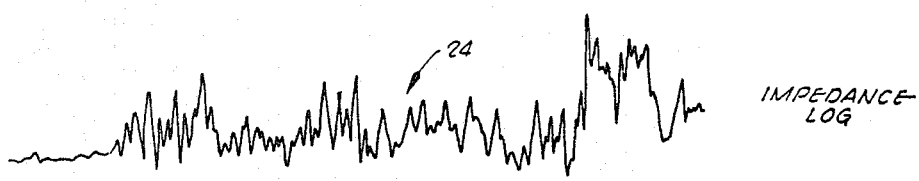
FIG. 3 shows an impedance log of the area referred to in FIG. 1 as it would be derived by the present invention.

In FIG. 3 there is an impedance log 24 as would be derived by the equipment which is the subject of this invention. The impedance log, while not showing the large number of small incremental density changes, does show the overall variations to very good advantage. Although this overall relative density plot is of a more coarse gradient, it contains most of the desired information and is extremely desirable from the standpoint that it can be taken from the earth's surface without the necessity of (a) drilling a borehole, an expensive and time-consuming operation, or (b) a pre-existent hole in the survey area.

*Circuit description*

Figure 4:
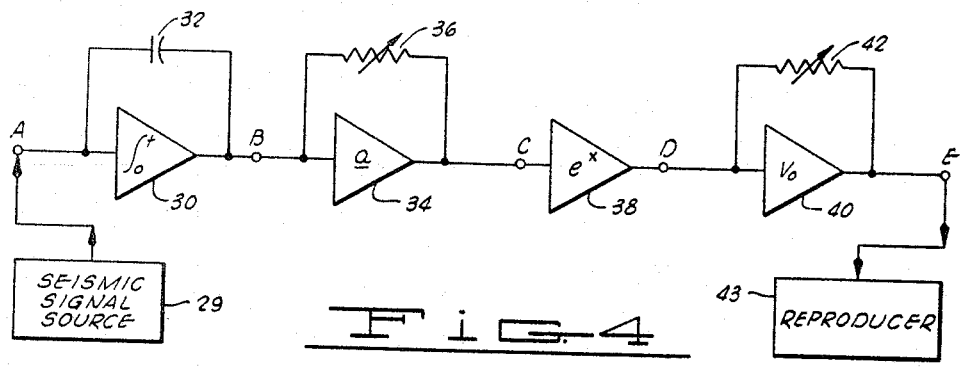
FIG. 4 shows a block diagram of the impedance log conversion device.

Referring to the drawings in greater detail, and particularly FIG. 4, there is shown a block diagram of the circuitry necessary for carrying out the analog conversion process. A seismic signal source, indicated generally as 29, provides an input to point A of the analog network. The signal source 29 may be a suitable seismic exploration equipment such as that disclosed in United States Patent No. 2,989,726 to J. M. Crawford and W. E. N. Doty wherein the output indication of the seismic signal has undergone primary processing or refinement and is in good form for application and further processing when applied to input point A. The input signal at point A will have the instantaneous value of a detected seismic signal, $S(t)$, and, as it was stated above, the signal is preferably phase correlated and amplitude normalized.

The input signal, $S(t)$, is applied to an integrator stage 30. In this case, it is shown as an operational amplifier employing suitable feedback via the capacitor 32; however, it has been ascertained that a simple resistance-capacitance integrator circuit of suitable time constant will serve well in this stage. In the case of either an operational amplifier or a resistance-capacitance network, the most critical consideration is to provide a response frequency which includes the range used in seismic work; a range of 2 to 200 c.p.s. should be sufficient. The output of the integrator circuit (appearing at point B) applies the integrated value of the seismic signal to a conventional type of operational amplifier 34. The amplifier 34 operates as a multiplier to introduce a gain factor $a$ as preset by the feedback resistor 36 in accordance with empirical knowledge found to be applicable in most circumstances due to certain generalities which can be assumed as to earth formation. The gain factor $a$ may be introduced as a linear amplification factor, either in accordance with values calibrated for the survey area, or on a "best fit" basis with available but partially complete data. The multiplied output signal at point C is then applied to an exponential proportioning stage 38 wherein the factor $e^x$ is introduced.

Figure 5:
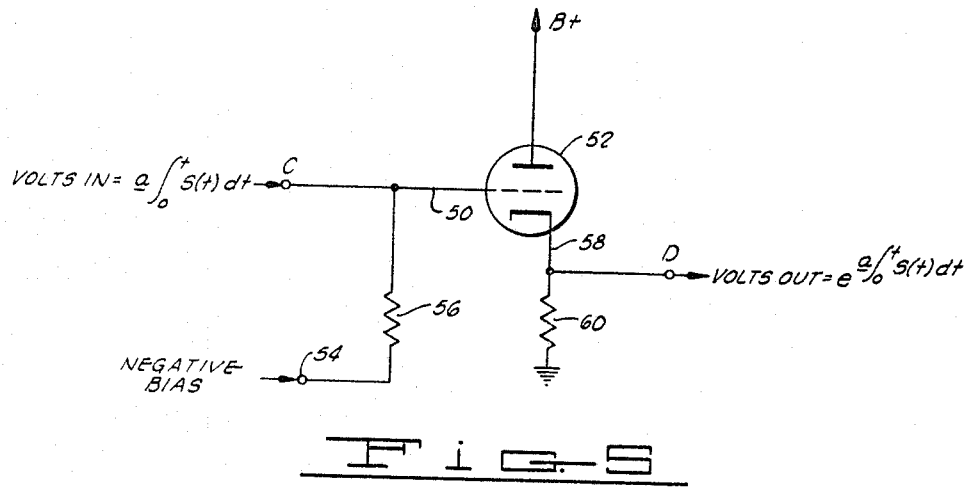
FIG. 5 shows in schematic form an exponential proportioning circuit which may be used in the FIG. 4 device.

Several embodiments of the exponential stage are used, but for purposes of this initial circuit description, the amplifier stage of FIG. 5 will be included. It should be understood that each of the exponential stages has desirable characteristics and that the choice of circuit will depend upon the requirements of the particular operation.

FIG. 5 shows an exponential proportioning stage in schematic form wherein a triode stage is operated as an exponential amplifier. The voltage representing the integrated and multiplied value of $S(t)$ is applied at point C which is connected to the control grid 50 of a triode 52. A negative bias voltage is applied at 54 through a high grid resistance 56 to maintain the control grid at a given level. This level is chosen in accordance with the particular tube and operating parameters which are to be employed for exponential amplification. A particularly good operation has been achieved by using a 12AT7 triode. The transfer characteristic of this tube represents an extremely close approximation to $y=e^x$ when the control grid 50 is biased at −5 volts and a plate supply (B+) of 200 volts is used. The triode 52 will then operate within a desired range along its $e_gi_b$ curve to effect exponential amplification of the integrated grid input signal at point C. The exponential output at point D is taken from the cathode 58 as it is developed across a cathode resistance 60. The ohmic value of the resistance 60 should be small enough so that the triode 52 does not act as a cathode follower to thereby give a characteristic other than the desired transfer characteristic. Also, it may be necessary to limit the input grid voltage at point C so that the voltage swing does not become large enough to exceed the grid voltage limits as chosen in selecting the operating portion of the $e_gi_b$ curve.

Referring again to FIG. 4, the exponential output at point D is then applied to a multiplier stage 40. The multiplier 40 is another operational amplifier of well-known type and a feedback potentiometer 42 controls the amplifier in accordance with its adjustment. This adjustment must provide an analog feedback value proportional to the initial velocity $V_o$ and this is set in by the operator in accordance with the available or derived knowledge of the survey area. A plot of the output voltage at point E versus time will reveal an impedance log, as shown in FIG. 3, which approximates a continuous velocity log (CVL) of the particular geographic location. Such a plot may be carried out by the use of conventional geophysical recording equipment, indicated generally at 43, which records the time-analog indication at a time-base as determined from that of the original seismic signal source 29.

It should be understood that other linear proportioning circuits such as calibrated attenuation circuits may be used in place of the operational amplifiers 34 and 40 to introduce the constant factors $a$ and $V_o$, respectively; however, from the standpoint of efficiency and accurate calibration, the operational amplifiers are preferred.

Operation

In order for the analog device to provide best results, it is necessary to select the best available seismic trace from the various recordings taken in a particular area. That is, the selection of a trace which has a minimum of multiples, ghosts and other reflections which can show up in seismic recordings. This more or less exemplary indication is then, preferably, amplitude normalized and phase correlated in known manner to provide the seismic trace upon which to operate. Referring again to FIG. 4, the seismic trace is converted to an electrical analog signal by conventional means at source 29 and applied to the input point A as a signal representative of $S(t)$. The signal $S(t)$ is integrated with respect to time in the integrator stage 30 to produce an analog signal proportional to $$\int_0^t S(t)dt$$

at the intermediate point B.

The integrated signal is then processed in the multiplier stage 34 which is controlled by feedback potentiometer 36 to introduce a gain factor proportional to $a$ in the conversion Equation 10. Thus, at point C, there is available an analog signal proportional to $$a\int_0^t S(t)dt$$

which is then applied at the input of the exponential proportioning stage 38. The exponential stage 38 maintains an input-output characteristic equal to (or a very close approximation to) $y=e^x$, so that the ouput signal at point D is proportional to $$e^{a\int_0^t S(t)dt}$$

Finally, to complete the conversion, the exponential voltage at point D is passed through a multiplier stage 40 to introduce the factor of $V_o$, the initial velocity, so that the resulting analog voltage at point E is proportional to $$V_0 e^{a\int_0^t S(t)dt}$$

This analog value represents a quantity which is equal to the instantaneous seismic impulse velocity, and, which is also directly proportional to the instantaneous acoustic impedance, so that a plot on the proper time-base at reproducer 43 will yield a time versus amplitude graph which is the approximate impedance log and a very close indication of a continuous velocity log (CVL) if one had been taken and was available in the particular area.

Alternative circuitry

Figure 6:
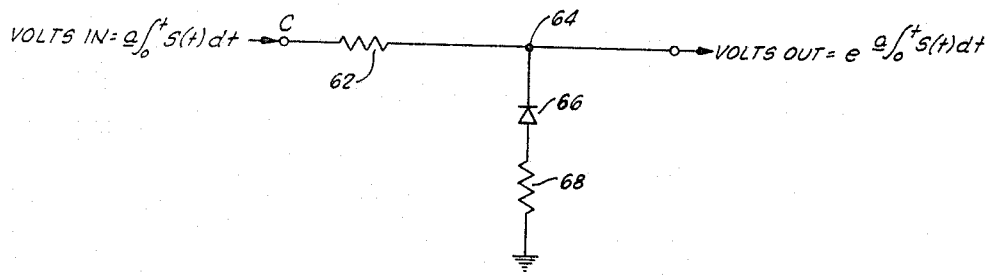
FIG. 6 shows in schematic form an alternative exponential proportioning circuit.

Another circuit which can be used for the exponential proportioning is shown in FIG. 6. In this case, the non-linear characteristic of a resistance-diode network is used. Once again, it may be necessary to limit the input voltage (integrated and multiplied) at point C to adhere to particular characteristics of the diode. Also, the non-linear characteristic of a diode may vary enough that it will be necessary to check several diodes of a type before arriving at one having the desired input-output characteristic.

In operation, the integrated voltage is applied at point C through a limiting resistor 62. The potential at point 64 is at D.-C. zero potential with no signal applied, so that any signal input will cause a respective positive or negative variation of voltage at the plate of a diode 66, thereby causing the diode resistance to vary nonlinearly, depending upon the input voltage level and polarity. A resistance 68 is selected to be a value which will function with the diode 66 of the network to maintain its operation in the selected range of the non-linear characteristic. When the circuit is properly constituted, a positive increase in voltage at point 64 causes the diode resistance to increase and thus causes an increasing impedance to ground; and, as the voltage input goes more negative, the impedance decreases.

Figure 7:
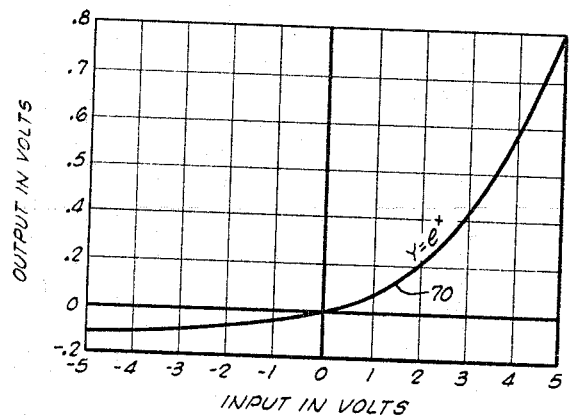
FIG. 7 shows the input-output characteristic curve of the resistance-diode network of FIG. 6.

Since the non-linear characteristic of a resistance-diode network can have widely varying values, depending upon the components, it has been found necessary to select the diode in accordance with the desired output curve. This exponential proportioning circuit has been used with good results when a IN34 type of diode was employed. A characteristic curve as derived for a particular resistance-diode network is shown in FIG. 7. Inspection of the graph will show that the selected input-output curve 70 is a very close approximation of the $Y=e^x$ function.

Figure 8:
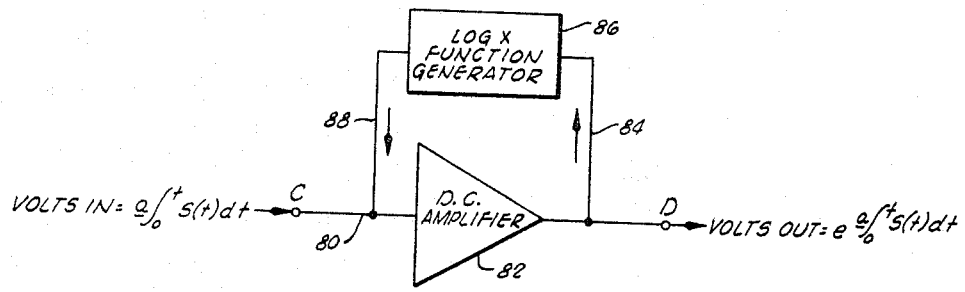
FIG. 8 shows a block diagram of another alternative exponential proportioning circuit.

FIG. 8 shows a third embodiment of the exponential proportioning circuit. In this alternative there is an operational amplifier employing a function generator in the feedback loop. This is a somewhat more sophisticated system and affords an even closer approximation to the $e^x$ function. This equipment is also desirable from the standpoint that it is more compact, due to much lower power requirements, and therefore it is much easier to transport and use in field operations.

The integrated signal, present at point C, is applied via a lead 80 to the input of a D.-C. amplifier 82 which can be a conventional type of operational amplifier. The model 1605D–C operational amplifier, commercially available from the Burr-Brown Company of Tucson, Ariz., has been used to good advantage. This is a transistorized amplifier of very compact design. The output of the operational amplifier 82 is fedback through loop lead 84 to a log X function generator 86, and the output voltage (an analog function) from generator 86 is applied by the second loop lead 88 to the input 80 of the operational amplifier 82. The function generator 86 can be one of the conventional types which is capable of constituting a log X control voltage. There are several types which could be used, but one which has proven to yield good performance in field operations is the log X diode Function Generator, commercially available from Electronics Associates Incorporated, of Long Branch, New Jersey. This circuit can be combined as a very small package yielding a highly accurate function; it has relatively low power requirements, and it utilizes supply voltages of values which are readily available in transistorized equipment. It should be understood, however, that many types of function generators are commercially available which can be employed to provide the proper feedback ratio as a function of log X.

Figure 9:
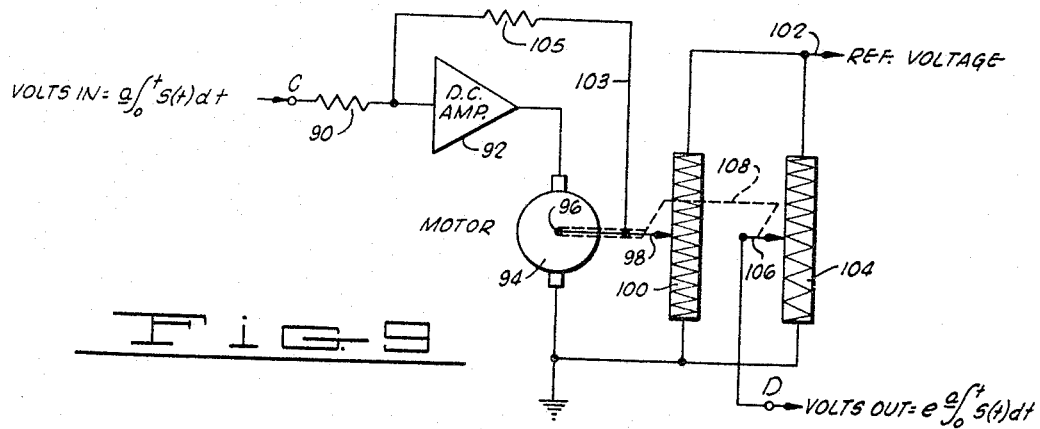
FIG. 9 shows a partial block diagram of still another alternative exponential proportioning circuit.

Another alternative for use as the exponential proportioning circuit is illustrated in FIG. 9. This is an electromechanical servo device for imposing the exponential function on the input voltage. Once again, the integrated and gain stabilized voltage, proportional to $$a\int_0^t S(t)dt$$

is present at point C. This voltage is applied through a limiting resistor 90 to the input of a D.-C. amplifier 92 which drives a servo motor 94 in response to the D.-C. output of the amplifier 92. A shaft 96 of motor 94 is connected to directly drive a wiper contact 98 of a linear potentiometer 100. The potentiometer 100 is connected as a voltage divider element between ground and a suitable D.-C. reference voltage, as applied on a lead 102, so that the wiper contact 98 taps off a reference voltage change which is proportional to the motor rotation and feeds it back to the input of amplifier 92. The feedback loop is made up of conductor 103 and a current limiting resistor 105. This feedback loop enables the wiper contact 98 to pick-off the D.-C. error voltage from the potentiometer 100, which will be proportional to the rotational movement of motor shaft 96, and reapply it to control the D.-C. amplifier 92 and, therefore, the positioning of motor 94. A logarithmic potentiometer 104 is connected in parallel to the linear potentiometer 100 so that it has the same reference potential (applied by lead 102) across its resistance; and also, the wiper contact 106 is positively ganged (as shown by dashed line 108) to the wiper contact 98, so that any movement of motor shaft 96 will produce a proportional and equal movement of both of the wiper contacts 98 and 106.

The function of this motor control circuit is such that when a given input voltage is applied to amplifier 92, e.g., $$v \cong a\int_0^t S(t)dt$$

it will cause motor shaft rotation in proportion; this shaft rotation is detected and indicated by respective D.-C. voltage changes at the wiper outputs of each of the potentiometers 100 and 104. The wiper 98 of linear potentiometer 100 taps off a linear voltage change which will be in the direction to feedback an equal and opposite voltage to the amplifier 98, tending to bring the motor back to zero. Hence, the feedback voltage on lead 103 will always tend to be proportional to the instantaneous value of $$a\int_0^t S(t)dt$$

With this same motor shaft rotation, the wiper contact 106 will have moved the same amount as wiper 98; however, wiper 106 will have traversed a logarithmic potentiometer 104 and will tap off a D.-C. voltage having an exponential change in value. If the same voltage is used as reference on both potentiometers, the linear one (100) and the logarithmic one (104), and their respective wiper contacts are moved an equal distance, an output of X from the linear potentiometer 100 will indicate an output of a quantity raised to the X power from the wiper of the logarithmic potentiometer 104. Hence, an output voltage proportional to the instantaneous values of $$e^{a\int_0^t S(t)dt}$$

can be taken from the wiper contact 106 whereupon it would show up as such at the output point D.

Various considerations may dictate the choice of the herein disclosed alternative exponential equation circuits, but each has its certain advantages.

Analog devices for approximating an impedance log, as disclosed herein, have a very great advantage over previously existing equipment. The present invention reduces the time necessary to derive a useable log reading by a wide margin, from two hours down to five minutes or less. The equipment cost is much less since prior processes required various, extensive digital computer circuitry. Accordingly, the equipment volume is reduced to a large degree so that compact equipment can be constructed which is easily transportable for direct use in field operations.

It is apparent then that the present invention provides apparatus which can be used in the field to rapidly determine the stratigraphic character of a given subsurface. The invention has the capability of providing a reliable approximation of an acoustic impedance log without the necessity for a drill hole, or other velocity log information about the particular area. Finally, the various alternatives which have been set forth in the specification, will enable the construction of equipment for impedance logging which may employ several modifications to fit the situation as dictated by requirements of cost outlay, equipment size, degree of precision, etc.

Changes may be made in the combination and arrangement of elements as heretofore set forth in this specification and shown in the drawings, it being understood, that changes may be made in the embodiments disclosed without departing from the spirit and scope of the invention as defined in the following claims.

We claim:
1. A system for obtaining lithological information in the form of an impedance log, comprising:
means for obtaining a seismogram of a given geographic location;
means for transducing the seismogram to a time-analog electrical signal;
means for integrating said signal;
means for exponentially amplifying said signal; and
means for proportioning said signal with a constant factor so that the resultant signal is a time-analog voltage representative of an impedance log of said location.

2. An apparatus for determining the lithological geometry of a given geographic location, comprising:
means for deriving a seismic signal having the time-analog values representing the reflection characteristics of the location;
means for integrating said seismic signal;
means for exponentially amplifying said integrated signal;
means for attenuating said amplified and integrated signal by a constant factor; and
means for transducing said attenuated signal to provide an impedance log of the location.

3. A device for determining the stratigraphic composition of a section of the earth, comprising:
means for deriving a phase correlated and amplitude normalized seismic signal representative of the reflection characteristics of said section of earth;
means for integrating said seismic signal;
means for multiplying said integrated signal by a first predetermined constant;

means for effecting exponential amplification of said multiplied signal;

means for multiplying said exponentially amplified signal by a second predetermined constant; and means receiving said second-multiplied signal and presenting it as a time analog indication of the stratigraphy of said section of earth.

4. A device for determining the stratigraphic composition of a given geographic location, comprising:

means for deriving a seismic signal having time-analog values representing the acoustic energy reflection characteristics of the location;

means for integrating said seismic signal;

means for imparting exponential proportion to said integrated signal values;

means for multiplying said exponentially equated signals by a predetermined constant factor; and means for presenting said multiplied signal as an impedance log of the said location.

5. A device as set forth in claim 4, wherein:

said exponential proportioning means is an amplifier stage having a transfer characteristic which is symmetrical with an exponential curve.

6. The device as set forth in claim 5, wherein:

said amplifier stage employs a 12AT7 type tube which has an $e_g i_b$ curve approximating the function $y = e^x$.

7. A device as set forth in claim 4, wherein:

said exponential proportioning means is a resistance-diode network which exhibits a non-linear input-output characteristic approximating an exponential curve.

8. A device as set forth in claim 4, wherein:

said exponential proportioning means is an operational amplifier employing a log X function generator in the feedback control network.

9. A device as set forth in claim 4, wherein:

said exponential proportioning means is a servo-controlled logarithmic potentiometer.

10. The device as set forth in claim 9 wherein said servo-controlled logarithmic potentiometer circuit comprises:

means for linearly amplifying said integrated signal;

servo motor means driven by said linearly amplified signal;

linear potentiometer means connected between a reference voltage and common and being directly driven by said motor to provide a varying feedback voltage to the input of the linear amplifier; and logarithmic potentiometer means also connected between a reference voltage and common and being directly driven by said motor to provide an exponentially equated varying output signal.

11. A signal processing device for determining stratigraphic composition from a seismic field record of a given terrestrial location, comprising:

input means for receiving the electrical seismic signals;

means connected to receive the input and to integrate said seismic signals;

operational amplifier means connected to amplify said integrator ouput by a predetermined gain factor;

exponential proportioning means receiving said amplified signal and producing an output which is an exponential function of said integrated and amplified signal;

second operational amplifier means connected to amplify said exponential voltage by a second predetermined gain factor; and reproducing means receiving the amplified exponential voltage and presenting it as a time-analog plot of the stratigraphic composition of the given terrestrial area.

12. A signal processing device as set forth in claim 11 wherein the exponential proportioning means comprises:

amplifier means having a transfer characteristic curve which is symmetrical to an exponential curve.

13. A signal processing device as set forth in claim 11 wherein the exponential proportioning means comprises:

a resistance-diode network having an input-output characteristic curve which is symmetrical to an exponential curve, 14. A signal processing device as set forth in claim 11 wherein the exponential proportioning means comprises:

operational amplifier means;

a feedback loop from the output to the input of said operational amplifier means; and a logarithmic function generating means in said feedback loop to control the gain characteristic of said operational amplifier in accordance with the logarithmic function.

15. A signal processing device as set forth in claim 14 wherein:

said logarithmic function generating means is a diode function generator producing an output voltage which conforms to the log X function.

16. A signal processing device as set forth in claim 11 wherein the exponential proportioning means comprises:

servo amplifier means receiving the input signal;

motor means driven in response to the amplifier signal;

linear reference potentiometer means directly driven by the motor means to tap off an error voltage proportional to motor rotation;

feedback means for applying said error voltage to the input of said servo amplifier means; and logarithmic reference potentiometer means directly driven by the motor means to tap off an exponential voltage which is proportioned in accordance with a given input signal to the servo amplifier means.

References Cited by the Examiner

UNITED STATES PATENTS 3,241,102   3/1966   Peterson _____ 340—15.5

BENJAMIN A. BORCHELT, *Primary Examiner.*

R. M. SKOLNIK, *Assistant Examiner.*